(12) United States Patent
Gauthe et al.

(10) Patent No.: US 11,636,956 B2
(45) Date of Patent: Apr. 25, 2023

(54) LIQUID METAL-COOLED NUCLEAR REACTOR INCORPORATING A COMPLETELY PASSIVE RESIDUAL POWER REMOVAL (DHR) SYSTEM

(71) Applicant: COMMISSARIAT A L'ENERGIE ATOMIQUE ET AUX ENERGIES ALTERNATIVES, Paris (FR)

(72) Inventors: Paul Gauthe, Avignon (FR); Alessandro Pantano, Aix-en-Provence (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 109 days.

(21) Appl. No.: 17/116,363

(22) Filed: Dec. 9, 2020

(65) Prior Publication Data

US 2021/0210229 A1 Jul. 8, 2021

(30) Foreign Application Priority Data

Dec. 9, 2019 (FR) ...................................... 19 13942

(51) Int. Cl.
*G21C 15/247* (2006.01)
*G21C 15/18* (2006.01)
(Continued)

(52) U.S. Cl.
CPC ......... *G21C 15/247* (2013.01); *G21C 15/185* (2019.01); *F28D 20/023* (2013.01); *G21C 1/02* (2013.01)

(58) Field of Classification Search
CPC .. G21C 1/02; G21C 1/03; G21C 15/18; F28D 20/023
See application file for complete search history.

(56) References Cited

U.S. PATENT DOCUMENTS

| 3,888,730 A | 6/1975 | Jackson | |
| 4,361,009 A * | 11/1982 | Schluderberg | F01K 3/06 60/659 |

(Continued)

FOREIGN PATENT DOCUMENTS

| JP | 02210295 A * | 8/1990 |
| JP | 2013-76675 A | 4/2013 |

(Continued)

OTHER PUBLICATIONS

Pialla, David, et al. "Overview of the system alone and system/CFD coupled calculations of the PHENIX Natural Circulation Test within the THINS project." Nuclear Engineering and Design 290 (2015): 78-86. (Year: 2015).*

French Preliminary Search Report dated Oct. 13, 2020 in French Application 19 13942 filed on Dec. 9, 2019 (with English Translation of Categories of Cited Documents), 3 pages.

(Continued)

*Primary Examiner* — Lily C Garner
(74) *Attorney, Agent, or Firm* — Oblon, McClelland, Maier & Neustadt, L.L.P.

(57) ABSTRACT

The invention concerns a liquid metal-cooled fast-neutron nuclear reactor (1), comprising a system (2) for removing at least part of both the nominal power and the residual power of the reactor, which ensures, at the same time:
removal of the residual power in a totally passive manner from the initial instant of the accident;
removal of the heat through the primary vessel;
implementation of a final cold source (container with PCM) other than the sodium/air or NaK/air heat exchangers used in the prior art.

14 Claims, 6 Drawing Sheets

(51) Int. Cl.
 *F28D 20/02* (2006.01)
 *G21C 1/02* (2006.01)

(56) References Cited

U.S. PATENT DOCUMENTS

| | | | | |
|---|---|---|---|---|
| 4,578,238 | A | * | 3/1986 | Artaud .................... G21C 1/03 |
| | | | | 376/404 |
| 4,794,882 | A | * | 1/1989 | Viken ................. F28D 20/0056 |
| | | | | 122/4 D |
| 2007/0253520 | A1 | | 11/2007 | Sim et al. |
| 2008/0219397 | A1 | | 9/2008 | Sim et al. |
| 2011/0168159 | A1 | * | 7/2011 | Lataperez ............... F24D 11/00 |
| | | | | 126/400 |
| 2013/0216015 | A1 | * | 8/2013 | Gautier ................... G21C 1/02 |
| | | | | 376/211 |

FOREIGN PATENT DOCUMENTS

| | | | |
|---|---|---|---|
| JP | 2013104711 A | * | 5/2013 |
| KR | 10-2015-0108999 A | | 10/2015 |
| KR | 20190054304 A | * | 5/2019 |
| WO | WO 2008/090446 A1 | | 7/2008 |
| WO | WO 2018/007739 A1 | | 1/2018 |

OTHER PUBLICATIONS

Wang, S. et al., "A passive decay heat removal system for emergency draining tanks of molten salt reactors," Nuclear Engineering and Design, vol. 341, 2019, 9 pages.

Edouard, H. et al., "ASTRID Nuclear Island design update in French-Japanese joint team development of Decay Heat Removal systems," 2018 International Congress on Advances in Nuclear Power Plants (ICAPP,) Apr. 2018, 7 pages.

* cited by examiner

LIQUID METAL-COOLED NUCLEAR REACTOR INCORPORATING A COMPLETELY PASSIVE RESIDUAL POWER REMOVAL (DHR) SYSTEM

TECHNICAL FIELD

The present invention concerns the field of fast-neutron nuclear reactors cooled with liquid metal, in particular with liquid sodium, referred to as FNR-Na's or SFR's (the acronym for "Sodium Fast Reactor") and forming part of the family of reactors referred to as Generation IV reactors.

More particularly, the invention concerns an improvement in the residual power removal function of these nuclear reactors.

The invention applies, in particular, to low- or medium-power reactors or SMR's (the acronym for "Small Modular Reactor"), typically with an operating power of between 50 and 200 MWe.

It should be noted at this point that the residual power of a nuclear reactor, also known as decay heat, is the heat produced by the core after the nuclear chain reaction has stopped and constituted by the decay energy of the fission products.

Although it is described in reference to a liquid sodium-cooled nuclear reactor, the invention applies to any other liquid metal, such as lead, as the heat transfer fluid of a primary circuit of a nuclear reactor.

PRIOR ART

In nuclear reactors, the basic safety functions that must be ensured on a permanent basis are containment, reactivity control, and removal of heat and residual power.

With respect to the removal of residual power, improved passivity and diversification of the systems are constantly being sought in order to ensure better overall reliability. The aim is to preserve the integrity of the structures, i.e. the first (fuel assembly cladding) and second (main vessel) containment barriers, even in the event of a general lack of electrical voltage over a long period of time, which corresponds to a Fukushima-type scenario.

More particularly, the removal of the residual power from a liquid-metal reactor in a completely passive manner through the main vessel is currently envisaged. Although it appears impossible to achieve this aim for a large reactor, because the power is too high, it can realistically be considered for low-power SMR's in order to ensure an intrinsic improvement in the safety of residual power removal, through the main vessel, and systems for said purpose, referred to hereinafter as DHR systems.

The DHR systems currently used in sodium reactors are not totally passive, because they actually implement an instrumentation and control system and/or human interventions. Moreover, these systems often use sodium flow circuits with a cold air source that may be defective. Furthermore, existing systems do not have diversified solutions in relation to the final cold source and can be sensitive to internal and external aggressions and malicious intent.

The DHR systems that already exist or are known in the literature can generally be placed in three categories:

A/ those arranged in the loops upstream from the energy conversion system;

B/ those arranged at least partially inside the primary vessel of the reactor;

C/ those arranged outside the primary or secondary vessel of the reactor.

The systems A/ release heat to liquid metal/air heat exchangers: [1]. Their major disadvantages are that they need a minimum number of two heat exchangers to be implemented, operate on a mainly active basis by forced convection with low natural convection performances, and require the use of a final cold source of the liquid metal/air heat exchanger type with risks of chemical interaction in the event of liquid metal leaks and external aggression to the final cold source.

The systems B/ also release the discharged heat to a final cold source of the liquid metal/air heat exchanger type.

Some of these systems B/ consist in arranging either the cold collector, or the hot collector, inside the primary vessel: [1]. In addition to the major disadvantages cited above for the systems A/, they also run the risk of contact with the radioactive liquid metal in the vessel, and require the reactor to be shut down in order to handle the components constituting these systems B/.

Patent application JP2013076675A also discloses a system B/ that is presented as a passive cooling system, part of which passes through the slab. The proposed solution has many disadvantages, including the seal to be provided through the slab, the possible transfer of heat to the dome, the need to shut down the reactor in order to handle the components of the system and the additional weight to be supported by the slab.

The systems C/ comprise heat exchangers, pipe bundles or air flows that are arranged outside the primary or secondary vessel.

Known systems C/ outside the secondary vessel have the following major disadvantages:

necessarily active operation, i.e. by forced convection;

limited efficiency due to the fact that the internal fluid used (thermal oil) is not a good heat transfer medium;

chemical instability of the heat transfer fluid at temperatures higher than 300-350° C.;

low cooling performance because it is carried out by radiation from the secondary vessel.

Patent application JP2013076675A cited above discloses a system C/ outside the secondary vessel: it comprises a heat collector and descending and ascending flow passages, around the primary vessel, formed respectively between the heat collector and a silo and between the heat collector and a guard vessel, outside air being introduced into the descending flow passage in order to flow downwards, then upwards to the bottom of the silo before finally being discharged to the outside. The design of this system entails the abovementioned disadvantages, i.e. lower efficiency, because air is not a good heat transfer medium and lower cooling performance because it is carried out by the secondary vessel. Moreover, there is a risk of external aggression to the final cold source, which is exposed to the outside.

Patent application KR20150108999 A discloses a system C/ outside the secondary vessel. Once more, the final cold source is exposed to the outside. Also, the disclosed solution suffers from many shortcomings. Firstly, the components of the system need to be welded to the secondary vessel. Moreover, the operation of the system requires the heat transfer fluid to change phase, which results in a major variation in density, and therefore mechanical stresses inside the piping, and it is ineffective in the phase preceding the puncturing of the vessel and the core meltdown.

There is therefore a need to improve the DHR systems of liquid metal-cooled nuclear reactors, in particular in order to overcome the disadvantages of the abovementioned systems A/, B/, C/, preferably involving minimal or no modifications to the nuclear reactors, including their buildings.

DISCLOSURE OF THE INVENTION

For this purpose, according to one of its aspects, the invention concerns a liquid metal-cooled fast-neutron nuclear reactor, comprising:
- a vessel referred to as the primary vessel, filled with a liquid metal as the heat transfer fluid of the primary circuit of the reactor;
- a vessel well arranged around the primary vessel, defining an inter-vessel space;
- a top slab, for enclosing the liquid metal inside the primary vessel;
- a system for removing at least part of both the nominal power and the residual power of the reactor, the system comprising:
  - a closed circuit filled with a heat transfer liquid comprising:
    - an array of a plurality of U-shaped pipes, arranged in the inter-vessel space, being distributed around the primary vessel and each extending along the primary vessel with the bottom of the U shapes facing the bottom of the latter,
    - a first collector, referred to as the cold collector, connected to one of the branches of the U, referred to as the cold branch, of each of the pipes of the array, the cold collector being arranged on the outside above the top slab,
    - a second collector, referred to as the hot collector, connected to the other branch of the U, referred to as the hot branch, of each of the pipes of the array, the hot collector being arranged on the outside above the top slab,
    - a single-pipe heat exchanger, one end of which is connected to the cold collector and the other end of which is connected to the hot collector,
    - the circuit being configured such that the heat transfer liquid flows inside same by natural convection and remains in the liquid state both during nominal operation of the nuclear reactor and during shutdown operation of the nuclear reactor releasing residual power;
  - a cold source comprising at least one container arranged at a distance from the primary vessel and above the top slab, the container containing a solid-liquid phase-change material (PCM) into which the single-pipe heat exchanger is inserted, the PCM being capable, during the exchange with the liquid metal of the single-pipe heat exchanger, of being in the solid state during nominal operation of the nuclear reactor and of switching to the liquid state during shutdown operation of the nuclear reactor releasing residual power. Therefore, the system according the invention performs the function of residual power removal (DHR) and ensures the containment of the radioactivity by preserving the integrity of the first radiological barrier (fuel cladding), and the second (main vessel).

The invention therefore consists essentially in producing a nuclear reactor that incorporates a system that ensures, at the same time:
- removal of the residual power in a totally passive manner from the initial instant of the accident;
- removal of the heat through the primary vessel;
- implementation of a final cold source (container with PCM) other than the sodium/air or NaK/air heat exchangers used in the prior art.

Removing heat through the primary vessel is advantageous in terms of safety because it is less sensitive to internal and external aggressions than conventional sodium circuits. The DHR system according to the invention therefore differs from the systems according to the prior art by the way in which the power is removed passively, via the outside of the primary vessel, using its high-temperature radiation towards the inter-vessel space. Unlike the systems according to the prior art, there is no need for auxiliary systems for assisting the circulation of the internal fluid.

The DHR system functions on a permanent basis, both during normal operation of the reactor at nominal power, and during accidental operation.

During nominal operation, the DHR system according to the invention removes part of the heat deriving from the temperature difference between the primary vessel and the array of pipes.

The diversification of the cold source, and the passive operation of the DHR system according to the invention, reinforce the safety concept of the installation with respect to external aggressions and the failure of another system.

Moreover, the implementation of a PCM helps achieve more compact dimensions than a final cold source of the liquid metal/air type.

If required, it is possible to envisage the addition of heat pumps in order to improve the circulation flow rate of the heat transfer liquid inside the closed circuit, and the initiation of natural circulation.

The invention applies to all liquid sodium-cooled nuclear reactors, regardless of the configuration thereof, characterising the mode of the primary circuit, i.e.:
- integrated FNR's in which the primary pumps and the heat exchangers are contained entirely inside the main vessel enclosing the core and are immersed in the coolant of said main vessel through the top slab of this vessel.
- partially integrated ("hybrid") FNR's in which only the primary pumps are contained inside the main vessel enclosing the core;
- FNR's referred to as "loop" FNR's in which the primary pumps and the intermediate heat exchangers are positioned in dedicated vessels outside the main vessel of the reactor which now only contains the core and the internal structure, the main vessel and the component vessel being collected by primary pipes.

According to one advantageous embodiment, the nuclear reactor comprises a thermal insulation layer for thermally insulating the vessel well, the thermal insulation layer being arranged in such a way as to insulate the cold branch from the hot branch of each of the pipes of the array.

Advantageously, the inter-vessel space is filled with a thermally conductive gas in order to cool the surface of the primary vessel.

According to an advantageous variant, the hot and cold collectors each have a toroidal shape centred around the central axis (X) of the primary vessel.

Preferably, the hot and cold collectors bear against support parts, welded directly to the slab.

According to one advantageous embodiment, the reactor comprises two separate containers. According to this embodiment, one of the two single-pipe heat exchangers of the two separate containers is preferably connected to an end of the cold collector opposite that to which the other of the single-pipe heat exchangers is connected.

According to an advantageous variant, the single-pipe heat exchanger(s) is/are coil type heat exchanger(s).

According to one advantageous embodiment, the nuclear reactor comprises a circulation loop comprising at least one hydraulic branch connecting the cold collector to the end of the single-pipe heat exchanger and at least one hydraulic branch connecting the hot collector to the end of the single-pipe heat exchanger.

Advantageously, the nuclear reactor comprises at least one containment building for containing each container of the removal system.

The heat transfer liquid of the circuit is preferably a liquid metal chosen from a lead-bismuth (Pb—Bi) binary alloy, a sodium-potassium (NaK) binary alloy or other ternary alloys of liquid metals.

The PCM filling the container(s) is preferably chosen from lead, cadmium or a mixture of salts made up of 53% KNO3, 40% NaNO2 and 7% NaNO in mass percentages.

The pipes and the hot and cold collectors of the circuit and, if applicable, the components of the loop, are preferably made from a material chosen from stainless steel AISI 316L, ferritic steels, nickel, Inconel®, and Hastelloy®.

The container(s) of the removal system is/are preferably made from Hastelloy® N.

Other advantages and features of the invention will become clearer upon reading the detailed description of implementation examples of the invention provided as illustrative and non-limiting examples, with reference to the following figures.

DETAILED DESCRIPTION

In the present application as a whole, the terms "vertical", "lower", "upper", "top", "higher", "bottom", "top", "below" and "above" are to be understood relative to a primary vessel filled with liquid sodium, as it is in the vertical operating configuration.

Figure 1:
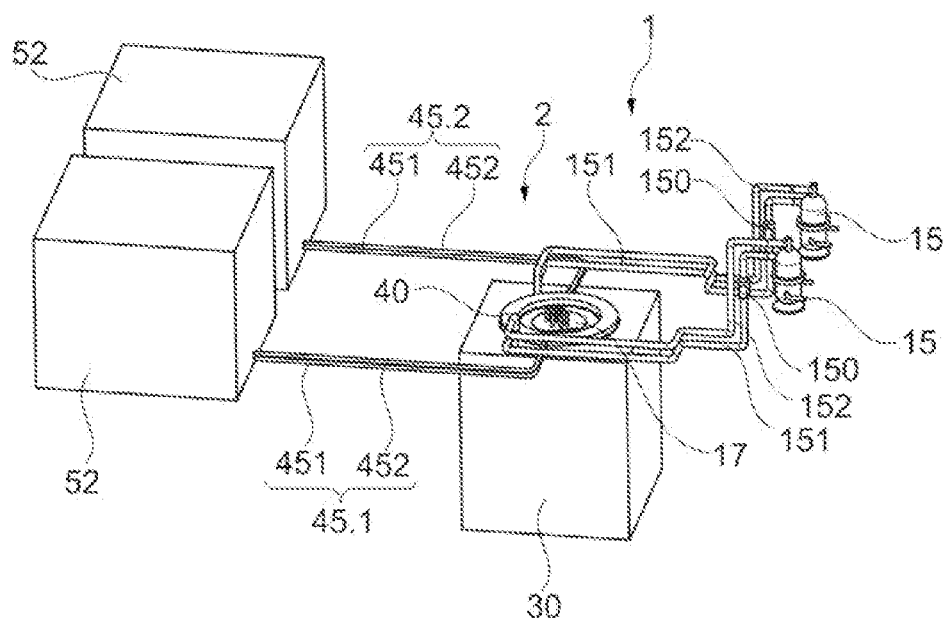
FIG. 1 is a schematic perspective view of a liquid sodium-cooled nuclear reactor (SFR) with a DHR system according to the invention.
Figure 2:
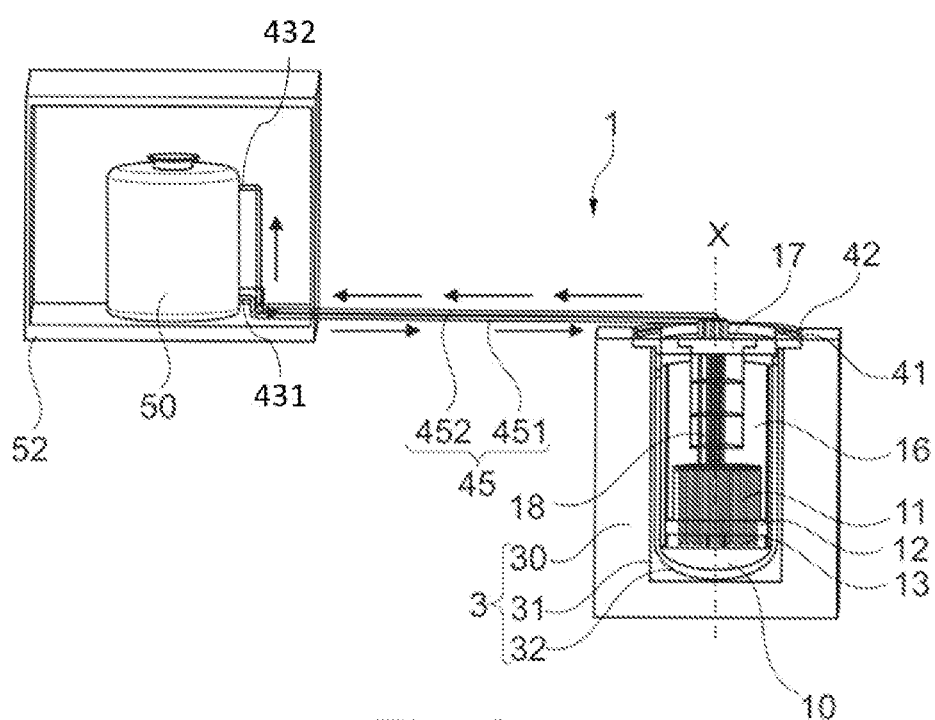
FIG. 2 shows a partial cross-section view of part of FIG. 1.

FIGS. 1 and 2 show a liquid sodium-cooled nuclear reactor (SFR) 1, with a loop architecture, with a system 2 for removing at least part of both the nominal power and the residual power of the reactor according to the invention.

Such a reactor 1 comprises a primary vessel 10 or reactor vessel filled with liquid sodium, referred to as primary liquid, and inside which the core 11, in which a plurality of fuel assemblies 110 are implanted, generating thermal energy through the fission of the fuel, and lateral neutron shield (LNS) assemblies 11, are present.

The vessel 10 supports the weight of the sodium of the primary circuit and the internal components.

The core 11 is supported by two separate structures allowing the functions of supporting and supplying coolant to the core to be separated:

a first mechanical pressure welded structure referred to as a diagrid 12 in which the feet of the fuel assemblies 110 are positioned and which is supplied with cold sodium (400° C.) by primary pumps;

a second mechanically welded structure referred to as a strongback 13 upon which the diagrid bears; the strongback generally bears on part of the inner wall in the bottom part of the primary vessel 10.

The diagrid 12 and the strongback 13 are typically made from stainless steel AISI 316L. The assembly claddings 110 constitute the first containment barrier while the vessel 10 constitutes the second containment barrier.

As shown, the primary vessel 10 is cylindrical in shape with a central axis X extended by a hemispherical bottom. The primary vessel 10 is typically made from stainless steel AISI 316L with a very small amount of boron in order to guard against the risks of cracking at high temperatures. Its outer surface is highly emissive in order to facilitate the radiation of heat towards the outside during the residual power removal phase.

A plug 14, referred to as the core cover plug, is arranged directly above the core 10.

In such a reactor 1, the heat produced during the nuclear reactions inside the core 11 is extracted by circulating the primary sodium, by means of pumping means 150 arranged in the reactor vessel 10, towards intermediate heat exchangers 15 arranged outside the vessel 10 in the example shown.

Therefore, the heat is extracted by the secondary sodium arriving cold, via its inlet duct 152, at an intermediate heat exchanger 15 before leaving, hot, through its outlet duct 151. The extracted heat is then used to produce steam in steam generators that are not shown, the produced steam being conveyed into one or more turbines and alternators that are also not shown. The turbine(s) transform(s) the mechanical energy of the steam into electrical energy.

The reactor vessel 10 is split into two separate zones by a separation device consisting of at least one vessel 16 arranged inside the reactor vessel 10. This separation device is also referred to as a redan and is made from stainless steel AISI 316L. Generally, as shown in FIG. 2, the separation device consists of a single internal vessel 16 that is cylindrical in shape, at least at the top.

Figure 4:
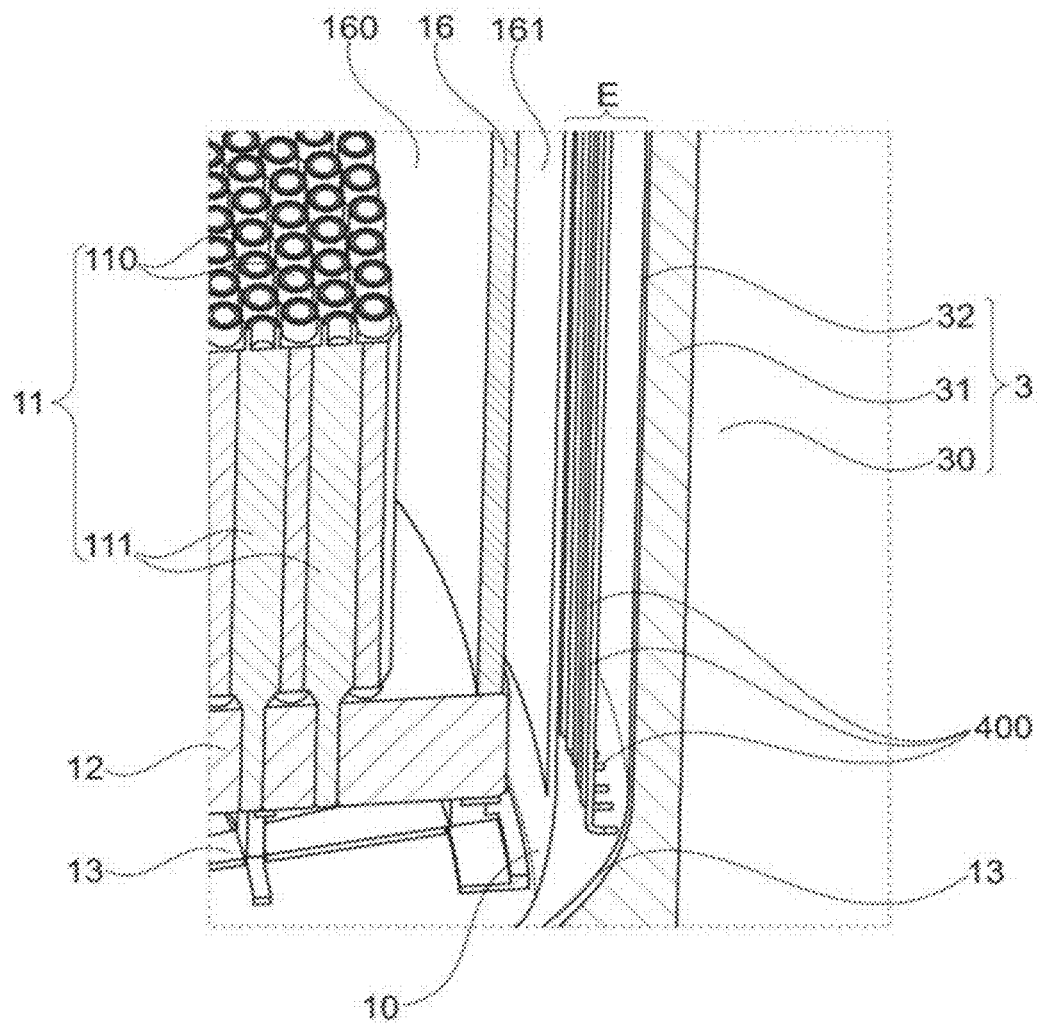
FIG. 4 is a partial longitudinal cross section view showing the primary vessel and some of the fuel assemblies of an SFR nuclear reactor and part of the array of pipes of a DHR system according to the invention.

The redan 16 is generally welded to the diagrid 12 as shown in FIG. 4.

As shown in FIG. 1, the primary sodium zone defined internally by the internal vessel 16 collects the sodium exiting the core 11: it constitutes the zone in which the sodium is hottest, and is therefore commonly referred to as the hot zone 160. The primary sodium zone 161 defined between the internal vessel 16 and the reactor vessel 10 collects the primary sodium and feeds the pumping means: it constitutes the zone in which the sodium is coldest and is therefore commonly referred to as the cold zone 161.

As shown in FIG. 2, the reactor vessel 10 is anchored and closed by a top slab 17 supporting the various components, such as the pumping means, which are not shown, some components of the removal system 2, as specified below, and the core cover plug 18. The top slab 17 is therefore a top cover that encloses the liquid sodium inside the primary vessel 10. The slab 17 is typically made from unalloyed steel (A42).

The sealing of the primary vessel 10 is ensured by a metal seal between the top slab 17 and the core cover plug 18.

The core cover plug 18 is a rotating plug that incorporates all the handling systems as well as all instrumentation required in order to monitor the core comprising the absorbing rods, the number of which depends on the type of core and its power, and the thermocouples and other monitoring devices. The cover plug 18 is typically made from stainless steel AISI 316L.

The space between the top slab 17 and the levels free of sodium, commonly referred to as the cover-gas plenum, is filled with a sodium-neutral gas, typically argon.

A support and containment system 3 is arranged around the primary vessel 10 and below its top slab 17.

Figure 5:
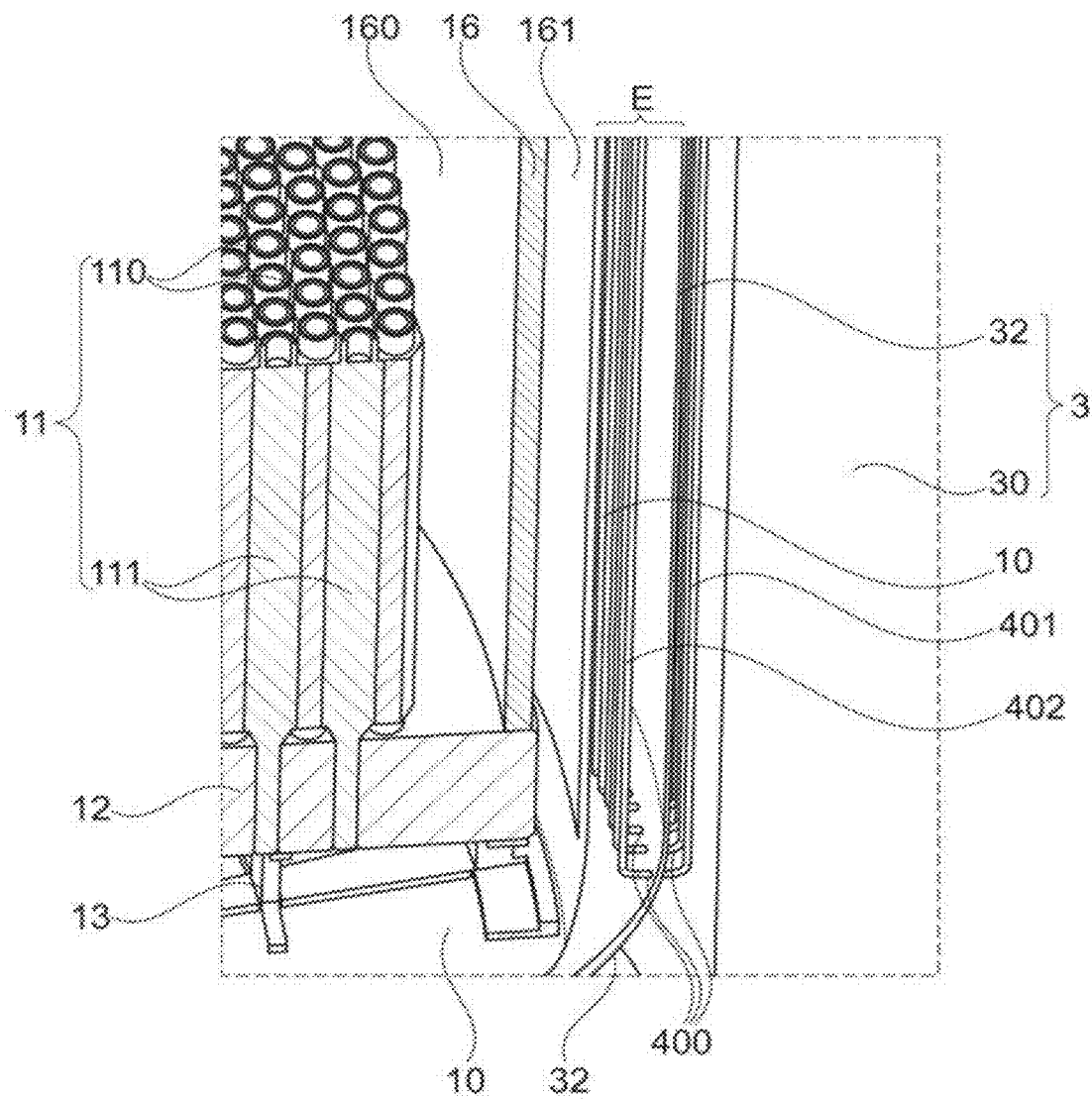
FIG. 5 shows FIG. 4 but without the presence of a layer of thermally insulating material.

More specifically, as shown in FIGS. 4 and 5, this system 3 comprises a vessel well 30 into which, from the outside towards the inside, a layer of thermally insulating material 31, a liner coating 32 and the primary vessel 10 of the reactor are inserted.

The vessel well 30 is a block with a generally parallelepiped external shape that supports the weight of the slab 17 and therefore of the components that it supports. The vessel well 30 has the functions of providing biological protection and protection against external aggressions and also of cooling the external environment in order to maintain low temperatures. The vessel well 30 is typically a block of concrete.

The layer of thermally insulating material 31 thermally insulates the vessel well 30. The layer 31 is typically made from polyurethane foam.

The liner coating 32 retains the primary sodium in the event of a leak from the primary vessel 10 and protects the vessel well 30. The liner 32 bears against the vessel well 30 and is welded at the top to the top slab 17. The liner 32 is typically made from stainless steel AISI 316L.

The space E between the liner coating 32 and the primary vessel, referred to as the inter-vessel space, is filled with a thermally conductive gas, such as nitrogen, in order to cool the surface of the primary vessel 10. It must be sufficient to allow for the installation of the inspection systems used. The thickness of the inter-vessel space E is typically approximately 30 cm.

The system 2 according to the invention for residual power removal (DHR) through the primary vessel 10 will now be described, more particularly with reference to FIGS. 3, 6 and 7.

The DHR system according to the invention 2 allows the residual power to be removed in a completely passive manner outside the primary vessel 10 by capturing the high-temperature radiation in the inter-vessel space E.

The system 2 comprises, first and foremost, a closed circuit 4 filled with a liquid metal, which comprises:
- an array 40 of a plurality of U-shaped pipes 400, arranged in the inter-vessel space E, which are distributed around the primary vessel 10 and each extend along the primary vessel 10 with the bottom of the U shapes facing the bottom of the latter,
- a first collector 41, referred to as the cold collector, welded directly to one of the branches 401 of the U, referred to as the cold branch, of each of the pipes of the array, the cold collector being arranged on the outside above the top slab 17,
- a second collector 42, referred to as the hot collector, welded directly to the other branch 402 of the U, referred to as the hot branch, of each of the pipes of the array, the hot collector being arranged on the outside above the top slab 17, and preferably directly above the cold collector 41,
- a single-pipe heat exchanger 43, one end of which 431 is connected to the hot collector 42 and the other end of which 432 is connected to the cold collector 41.

The top part of the top slab 17 supports the weight of the parts that support the cold collector 41 and the hot collector 42.

The top slab 17 has openings of different types in order to allow the insertion of each pipe 400 of the array 40. Each tube 400 therefore enters and exits via the top of the slab 17.

In the case of a loop reactor, as shown, some pipes 400 bypass the branches of the primary circuit if they exit/enter via the sides of the primary vessel 10.

As shown in FIG. 4, the cold branch 401 of the U-shaped pipes 400 is fully inserted into the thermally insulating layer 31 in order to reduce the temperature of same, in order to prevent fluid circulation inversion phenomena and, finally, in order to allow the natural circulation of the liquid metal inside each pipe 400.

The array 40 of pipes has a diameter that depends on the diameter of the primary vessel 10 and a height that is sufficient to provide the surface area required in order to remove the required amount of heat.

In other words, the total number and the dimensions of the U-shaped pipes 400 that make up the array 40 depend on the diameter of the primary vessel 10 and the power of the nuclear reactor core 11. For example, the pitch of the pipes of the array can be equal to 10 cm, which is a good compromise in terms of manufacture and heat absorption by radiation.

Also, for example, the outer diameter of each pipe 400 is set at a standard dimension of 5 cm, in order to minimise head loss, reduce the space requirement of the pipes in the inter-vessel space E and maximise the surface area exposed to the primary vessel 10. The thickness of each pipe depends on the mechanical stresses applied by the internal liquid metal and the weight of same.

The material of each pipe 400 needs to have good emissivity characteristics on the side of the hot branch 402 that absorbs heat. The material of the pipes is typically chosen from stainless steel AISI 316L, the ferrite steels, nickel, Inconel® and Hastelloy®. This material depends on the internal fluid used for the closed circuit 4.

This internal fluid is a chemically stable liquid metal of low viscosity that has good thermal conduction and transfer properties, is chemically compatible with all the piping of the circuit 4 and is capable of functioning in natural convection in a temperature range between 150-600° C. The liquid metal of the circuit 4 can typically be chosen from an NaK or Pb—Bi alloy, or one of the ternary alloys of liquid metals, etc.

Figure 3:
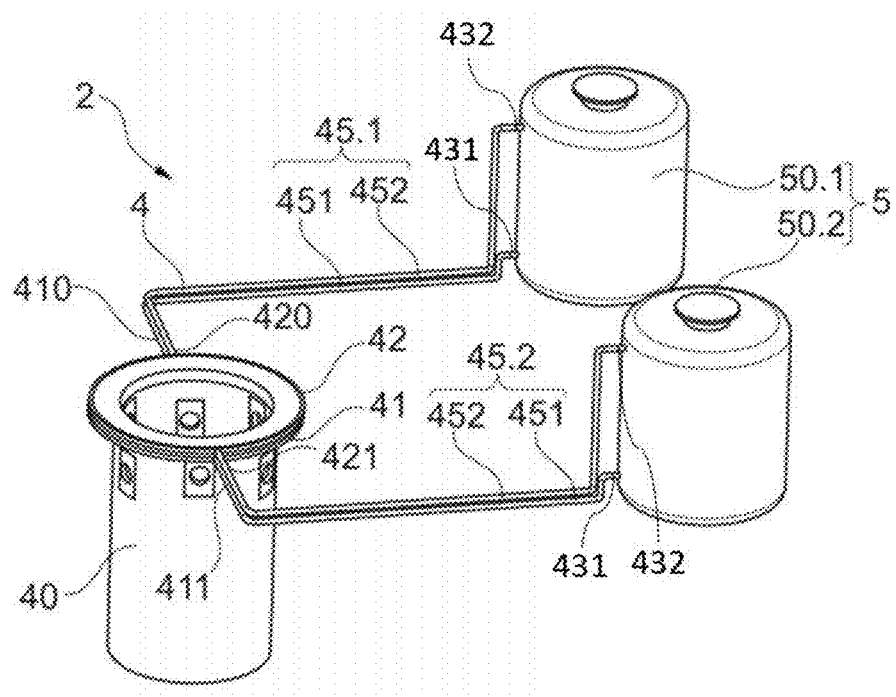
FIG. 3 is a schematic perspective view of all the components of the closed liquid metal circuit of a DHR system according to the invention.

As shown in FIG. 3, the cold 41 and hot 42 collectors have a general toroidal shape centred around the central axis (X) of the primary vessel 10. These collectors 41, 42 bear on support parts 44 welded directly to the top slab 17.

The purpose of the single-pipe heat exchanger 43 is to remove the heat absorbed by the internal fluid of the system 2 by cooling it when it exits and by allowing better performance in terms of the removal of residual power. As shown, the single-pipe heat exchanger 43 is preferably a coil type heat exchanger so as to maximise the surface area for exchange between the internal fluid and its external environment, as specified below. The single-pipe heat exchanger 43 is typically made from stainless steel AISI 316L.

Figure 6:
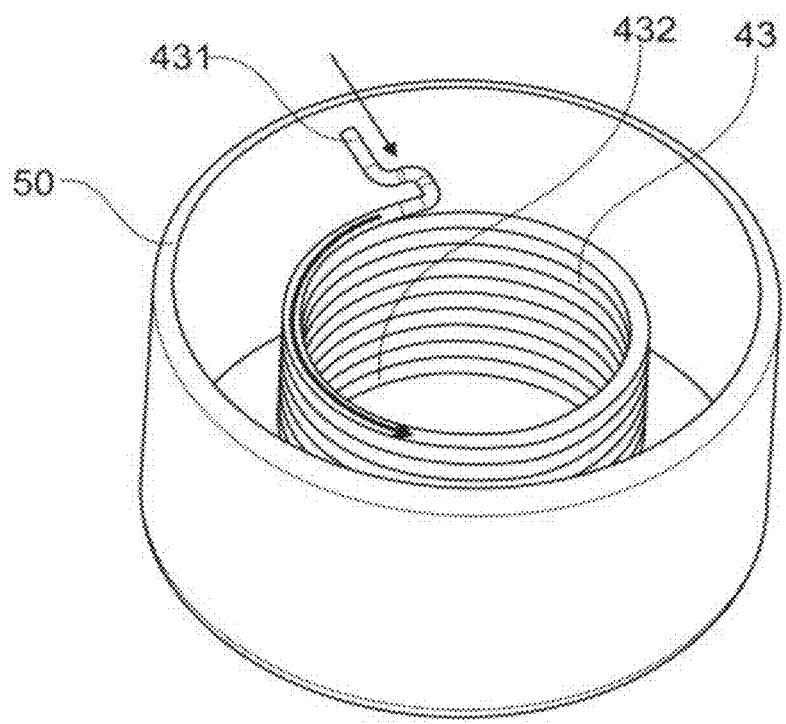
FIG. 6 is a schematic perspective view of the inside of a container housing a PCM and a single-pipe heat exchanger of the closed circuit of a DHR system according to the invention.
Figure 7:
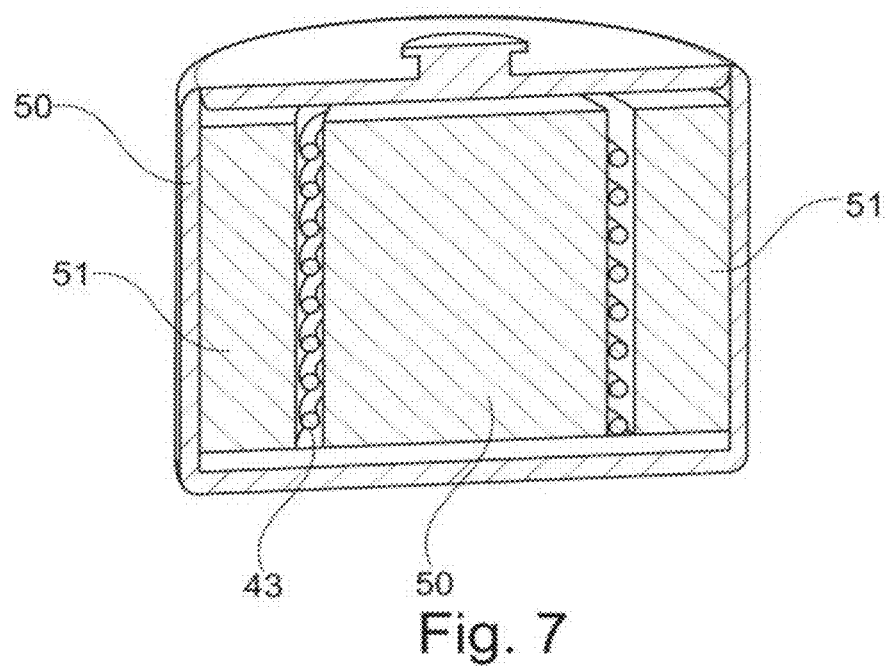
FIG. 7 is a schematic longitudinal cross section view of a container housing a PCM and a single-pipe heat exchanger of the closed circuit of a DHR system according to the invention.

As shown in FIGS. 5 and 6, the DHR system 2 according to the invention also comprises a cold source 5 configured to absorb the heat removed by the radiation of the primary vessel 10 through the whole of the array 40 of pipes 400. The dimensions of the cold source depend on both the power of the reactor core 11, which effectively determines the residual power to be removed, and the envisaged duration of the transient, which therefore requires proportional thermal inertia.

The cold source 5 comprises at least one container 50, arranged at a distance from the primary vessel 10 and at a higher level relative to the top slab 17.

In the example shown, the cold source 5 consists of two separate containers 50.1, 50.2.

Each container 50, 50.1, 50.2 contains a solid-liquid phase-change material (PCM) 5 into which the single-pipe heat exchanger 43 is inserted.

Each container 50, 50.1, 50.2 disperses, by natural convection and radiation from its walls, some of the heat removed during the accident phase and all of the heat removed by the system 2 during the operation of the reactor at nominal power.

As shown, each container 50, 50.1, 50.2 is generally cylindrical in shape and is preferably positioned on a concrete base in order to support its weight and that of the PCM 51 and the single-pipe heat exchanger 43.

The outer walls of each container 50, 50.1, 50.2 preferably have high emissivity properties in order to increase the heat emitted by radiation. Each container 50, 50.1, 50.2 is typically made from Hastelloy®-N.

The dimensions of each container 50, 50.1, 50.2 depend on the PCM that it contains and the power to be dispersed, during normal operation, and in the event of an accident.

The PCM acts as a thermal buffer that is capable, during the exchange with the liquid metal of the single-pipe heat exchanger, of being in the solid state during nominal operation of the nuclear reactor and of switching to the liquid state during shutdown operation of the nuclear reactor releasing residual power.

In other words, during the nominal operation phase of the reactor, the PCM is in the solid state, and it transmits, by conduction, the heat given off by the single-pipe heat exchanger 43, which is then released to the walls of the container 50, 50.1, 50.2 by convection and radiation.

During an accident phase, the PCM in the liquid state needs to store the heat given off by the single-pipe heat exchanger 43 and therefore cool the liquid metal of the circuit 2. Preferably, in the solid state, the PCM consists of a powder or a set of spheres of small dimensions that improve heat conduction while facilitating the arrangement of same in the container in and around the single-pipe heat exchanger 43.

For good operation in a stationary state at nominal reactor power, the PCM needs to have high thermal conductivity.

For good operation in an accident state, the PCM at the same time has the characteristics of high thermal inertia (high specific heat and density), a melting point of between 250 and 400° C., a use temperature of between 150° C. (solid state) and 600° C. (liquid state) and high latent heat.

The PCM must naturally also be chemically compatible with the internal fluid of the closed circuit 2, such that, in the event of interaction following a leak from the single-pipe heat exchanger 43, no problem arises.

The PCM is typically chosen from cadmium, when the heat transfer fluid inside the closed circuit 2 is an NaK alloy or lead, when the heat transfer fluid is a Pb—Bi alloy.

Preferably, each container 50, 50.1, 50.2 is contained in a containment building 51. The final cold source 5 of the system 2 according to the invention is thus protected against possible external aggressions.

The inner walls of the containment building 51 preferably have high emissivity characteristics in order to more easily remove the heat radiated by the outer walls of the container 50, 50.1, 50.2 housed therein.

In order to position the cold source 5 at an optimal distance from the primary vessel 10, the hydraulic circuit 2 comprises a connecting loop 45, 45.1, 45.2 comprising a set of pipes and, if necessary, valves between the cold 41 and hot 42 collectors and each single-pipe heat exchanger 43.

More specifically, as shown in FIGS. 1 to 3 and 6, each connecting loop 45, 45.1, 45.2 comprises a hydraulic branch 451 that connects the cold collector 41 to the cold end 431 of the single-pipe heat exchanger 43 and a hydraulic branch 452 that connects the hot collector 42 to the hot end 432 of the single-pipe heat exchanger 43. The arrow in FIG. 6 shows the flow direction of the liquid inside the heat exchanger 43.

Thus, the cold collector 41 distributes the flow of liquid metal inside the cold branch 451 to each cold branch 401 of each tube 400 with a U-shaped bottom and the hot collector 42 collects the internal liquid metal originating from each hot branch 401 of each tube 400 with a U-shaped bottom in order to convey it to the hot branch 452.

According to an advantageous embodiment shown in FIG. 3, when the cold source 2 comprises two separate containers 50.1, 50.2, the two cold branches 451 that are connected thereto are connected to opposite ends 410, 411 of the cold collector 41. The same applies to the two hot branches 452, which are connected to opposite ends 420, 421 of the hot collector 42.

Advantageously, the cold 451 and hot 452 branches are dimensioned so as to be as short as possible in order to reduce the head losses of same and increase the natural convection flow rate in the closed hydraulic circuit 4.

Thus, according to the invention, the closed hydraulic circuit 4 described above is configured such that the heat transfer liquid metal flows inside same by natural convection and remains in the liquid state both during nominal operation of the nuclear reactor and during shutdown operation of the nuclear reactor releasing residual power.

During nominal power operation of the reactor, the single-pipe heat exchanger 43 is in a completely solid medium, because the PCM is at a stationary temperature lower than its melting temperature. The heat released by the single-pipe heat exchanger 43 is transferred by convection to the PCM 51 in the solid state.

During the accident phase, the PCM 51 turns to liquid and stores the heat given off by the heat exchanger 43 and therefore cools the liquid metal inside the closed hydraulic circuit 4. The invention is not limited to the examples described above; in particular, features from the illustrated examples can be combined with each other in variants that are not shown. Other variants and embodiments can be envisaged without departing from the scope of the invention.

The DER system described above in relation with a loop nuclear reactor can absolutely be implemented in an integrated nuclear reactor.

If designing an integrated reactor, the array 40 of pipes surrounds the entire primary vessel 10 in a uniform manner.

In some loop reactors, the pipes 400 that are located next to the primary circuit can meet in a micro-collector at the branch, in order to prevent possible hot spots in the U-shaped pipes 400 involved.

LIST OF CITED REFERENCES

[1]: HOURCADE E. et al., *"ASTRID Nuclear Island design: update in French-Japanese joint team development of Decay Heat Removal system"*, 2018, ICAPP.

The invention claimed is:

1. A liquid metal-cooled fast-neutron nuclear reactor, comprising:
   a vessel referred to as the primary vessel, filled with a liquid metal as the heat transfer fluid of the primary circuit of the reactor;
   a vessel well arranged around the primary vessel, defining an inter-vessel space;
   a top slab for enclosing the liquid metal inside the primary vessel;
   a removal system for removing at least part of both the nominal power and the residual power of the reactor, the removal system comprising:
      a closed circuit filled with a heat transfer liquid comprising:
         an array of a plurality of U-shaped pipes, arranged in the inter-vessel space, being distributed around the primary vessel and each U-shaped pipe extending along the primary vessel with the bottom of the U shapes being adjacent to a bottom of the primary vessel,
         a first collector, referred to as the cold collector, connected to one of the branches of the U, referred to as the cold branch, of each of the pipes of the array, the cold collector being arranged on the outside of the primary vessel, above the top slab,
         a second collector, referred to as the hot collector, connected to the other branch of the U, referred to as the hot branch, of each of the pipes of the array, the hot collector being arranged on the outside of the primary vessel, above the top slab,
         at least one single-pipe heat exchanger, one end of which is connected to the cold collector and the other end of which is connected to the hot collector,
      the circuit being configured such that the heat transfer liquid flows inside the circuit by natural convection and remains in the liquid state both during nominal operation of the nuclear reactor and during shutdown operation of the nuclear reactor releasing residual power;
         a cold source comprising at least one container arranged at a distance from the primary vessel and above the top slab, the container containing a solid-liquid phase-change material (PCM) into which the single-pipe heat exchanger is inserted, the PCM being capable, during the exchange with the liquid metal of the single-pipe heat exchanger, of being in the solid state during nominal operation of the nuclear reactor and of switching to the liquid state during shutdown operation of the nuclear reactor releasing residual power.

2. The nuclear reactor according to claim 1, wherein the nuclear reactor has a loop architecture.

3. The nuclear reactor according to claim 1, comprising a thermal insulation layer for thermally insulating the vessel well, the thermal insulation layer being arranged in such a way as to insulate the cold branch from the hot branch of each of the pipes of the array.

4. The nuclear reactor according to claim 1, wherein the inter-vessel space is filled with a thermally conductive gas in order to cool the surface of the primary vessel.

5. The nuclear reactor according to claim 1, wherein the hot and cold collectors each have a toroidal shape centered around the central axis of the primary vessel.

6. The nuclear reactor according to claim 1, wherein the hot and cold collectors bear against support parts, welded directly to the top slab.

7. The nuclear reactor according to claim 1, the closed circuit comprising two single-pipe heat exchangers, one end of each single-pipe heat exchanger being connected to the cold collector and the other end of said single-pipe heat exchanger being connected to the hot collector,
   the cold source comprising two separate containers arranged at a distance from the primary vessel and above the top slab, each of the containers containing a solid-liquid phase-change material (PCM) into which one of the two single-pipe heat exchanger is inserted, the PCM being capable, during the exchange with the liquid metal of the said single-pipe heat exchanger, of being in the solid state during nominal operation of the nuclear reactor and of switching to the liquid state during shutdown operation of the nuclear reactor releasing residual power.

8. The nuclear reactor according to claim 7, wherein one of the two single-pipe heat exchangers is connected to an end of the cold collector opposite that to which the other of the two single-pipe heat exchangers is connected.

9. The nuclear reactor according to claim 1, wherein the single-pipe heat exchanger(s) is a coil type heat exchanger(s).

10. The nuclear reactor according to claim 1, comprising a circulation loop comprising at least one hydraulic branch connecting the cold collector to the end of the single-pipe heat exchanger and at least one hydraulic branch connecting the hot collector to the end of the single-pipe heat exchanger.

11. The nuclear reactor according to claim 1, comprising at least one containment building for containing the container(s) of the removal system.

12. The nuclear reactor according to claim 1, wherein the heat transfer liquid of the circuit is a liquid metal chosen from a lead-bismuth (Pb—Bi) binary alloy, a sodium-potassium (NaK) binary alloy or a ternary alloy of liquid metals.

13. The nuclear reactor according to claim 1, wherein the PCM filling the container(s) is chosen from lead, cadmium or a mixture of salts made up of 53% KNO3, 40% NaNO2 and 7% NaNO in mass percentages.

14. The nuclear reactor according to claim 1, wherein the U-shaped pipes of the array and the hot and cold collectors of the circuit are made from a material chosen from stainless steel AISI 316L, ferritic steels, and nickel.

* * * * *